US009681415B2

(12) United States Patent
Tamura et al.

(10) Patent No.: US 9,681,415 B2
(45) Date of Patent: Jun. 13, 2017

(54) GATEWAY DEVICE, MOBILE COMMUNICATION SYSTEM, AND PAGING METHOD

(71) Applicant: NEC Corporation, Tokyo (JP)

(72) Inventors: Tomu Tamura, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 14/430,248

(22) PCT Filed: Sep. 17, 2013

(86) PCT No.: PCT/JP2013/005487
§ 371 (c)(1),
(2) Date: Mar. 23, 2015

(87) PCT Pub. No.: WO2014/050017
PCT Pub. Date: Apr. 3, 2014

(65) Prior Publication Data
US 2015/0249969 A1  Sep. 3, 2015

(30) Foreign Application Priority Data

Sep. 25, 2012 (JP) ................................. 2012-210767

(51) Int. Cl.
*H04W 68/02* (2009.01)
*H04W 68/04* (2009.01)
(Continued)

(52) U.S. Cl.
CPC ........... *H04W 68/02* (2013.01); *H04W 68/04* (2013.01); *H04W 88/16* (2013.01); *H04W 92/12* (2013.01)

(58) Field of Classification Search
CPC ... H04W 68/02; H04W 88/16; H04W 84/022; H04W 76/02; H04W 68/08; H04W 68/00;
(Continued)

(56) References Cited

U.S. PATENT DOCUMENTS

2007/0281715 A1  12/2007  Take
2012/0264443 A1  10/2012  Ng et al.
(Continued)

FOREIGN PATENT DOCUMENTS

EP       2348759 A1    7/2011
JP   2006-210987 A    8/2006
(Continued)

OTHER PUBLICATIONS

International Search Report corresponding to PCT/JP2013/005487, dated Nov. 26, 2013 (3 pages).
(Continued)

*Primary Examiner* — Hirdepal Singh
(74) *Attorney, Agent, or Firm* — Wilmer Cutler Pickering Hale and Dorr LLP

(57) ABSTRACT

A gateway device (10) according to the present invention includes a memory (11) that stores information regarding an environment around a radio base station; a controller (12) that generates a message for paging a mobile station which camps on the radio base station to execute processing for determining information of a radio base station to which the message is transmitted based on the stored information; and a transmission unit (13) that transmits the message. Paging optimization is thus achieved by reducing the number of paging messages.

10 Claims, 14 Drawing Sheets

(51) Int. Cl.
*H04W 92/12* (2009.01)
*H04W 88/16* (2009.01)

(58) Field of Classification Search
CPC ............. H04W 68/025; H04W 76/022; H04W 52/0232; H04W 68/04; H04W 68/06; H04W 76/06; H04W 84/042; H04W 8/26
See application file for complete search history.

(56) References Cited

U.S. PATENT DOCUMENTS

| | | | | |
|---|---|---|---|---|
| 2013/0128873 | A1* | 5/2013 | Eipe | H04W 76/02 370/338 |
| 2014/0082697 | A1* | 3/2014 | Watfa | H04W 76/025 726/3 |
| 2014/0120917 | A1* | 5/2014 | Yoshihara | H04W 36/0033 455/436 |
| 2014/0155062 | A1* | 6/2014 | Hahn | H04W 72/0453 455/434 |
| 2014/0206352 | A1* | 7/2014 | Mochizuki | H04W 60/04 455/435.1 |
| 2014/0370922 | A1* | 12/2014 | Richards | H04W 68/02 455/458 |
| 2015/0065130 | A1* | 3/2015 | Inakoshi | H04W 24/02 455/435.2 |
| 2015/0215774 | A1* | 7/2015 | Huang | H04W 76/022 455/422.1 |
| 2015/0271783 | A1* | 9/2015 | Hu | H04W 68/06 455/458 |

FOREIGN PATENT DOCUMENTS

| | | | |
|---|---|---|---|
| JP | 2010-213273 | A | 9/2010 |
| JP | 2010213273 | A * | 9/2010 |
| WO | WO-2010/151186 | A1 | 12/2010 |
| WO | WO-2011/052136 | A1 | 5/2011 |
| WO | WO-2012/051752 | A1 | 4/2012 |
| WO | WO-2012/111844 | A1 | 8/2012 |

OTHER PUBLICATIONS

Motorola, "Paging Load Reduction in Asynchronous Cells," R3-082983 3GPP TSG-RAN-WG3, Meeting #62, Nov. 10-14, 2008 (7 pages), http://www.3gpp.org/ftp/tsg_ran/WG3_lu/TSGR3_62/docs/R3-082983.zip 3GPP TS 36.413 V10.3.0, "Evolved Universal Terrestrial Radio Access Network," (E-UTRAN), S1 Application Protocol (S1AP) Release 10, Sep. 2011 (254 pages).

Keiji Tachikawa, "W-CDMA Mobile Communication Systems," Maruzen Company, Ltd., 2002, pp. 254-257.

Japanese Office Action issued by the Japan Patent Office for Japanese Application No. 2014-538148 dated Oct. 6, 2015 (7 pages).

Nokia Siemens Networks, "HeNB GW—addressing aspects," Nokia, 3GPP TSG RAN WG3 Meeting #59 bis, R3-080817, Agenda Item 10.1.2, Shenzen, China, 4 pages (Mar. 31-Apr. 3, 2008).

Japanese Decision to Grant a Patent issued in corresponding Japanese Application No. 2014-538148, dated Apr. 5, 2016, 5 pages.

Supplementary European Search Report issued in corresponding European Application No. 13842097.1, dated May 11, 2016, 7 pages.

* cited by examiner

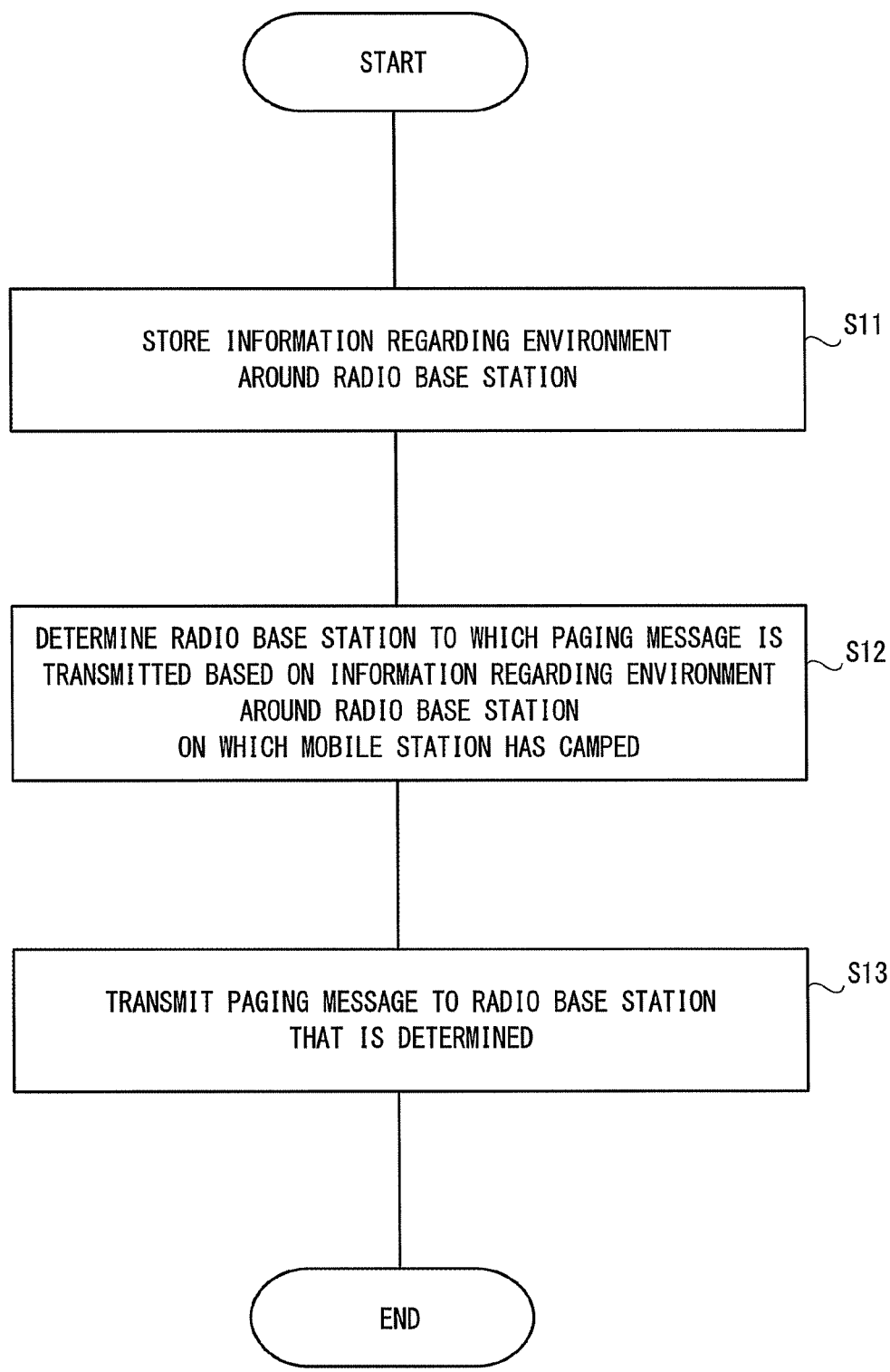

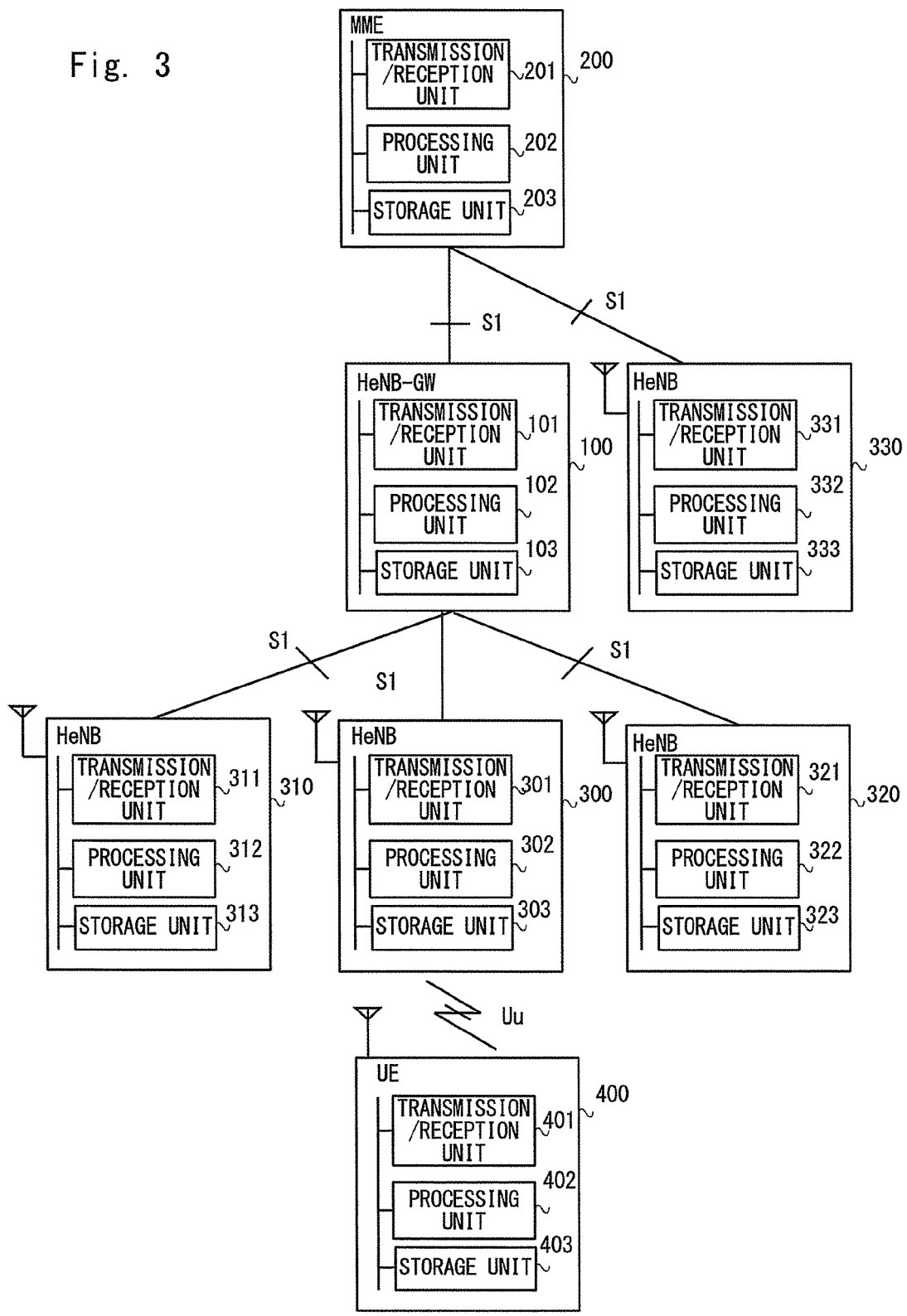

9.1.8.4 S1 SETUP REQUEST

This message is sent by the eNB to transfer information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(1..150 ...) | | YES | ignore |
| Supported TAs | | 1..<maxnoofTACs> | | Supported TAs in the eNB | GLOBAL | reject |
| >TAC | M | | 9.2.3.7 | Broadcasted TAC | - | |
| >Broadcast PLMNs | | 1..<maxnoofBPLMNs> | | Broadcasted PLMNs | - | |
| >>PLMN Identity | M | | 9.2.3.8 | | | |
| Default paging DRX | M | | 9.2.1.16 | | YES | ignore |
| CSG Id List | | 0..1 | | | GLOBAL | reject |
| >CSG Id | M | 1 to <maxnoofCSGIds> | 9.2.1.62 | | | |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |

| Range bound | Explanation |
|---|---|
| maxnoofBPLMNs | Maximum no. of Broadcasted PLMNs. Value is 6. |

| Range bound | Explanation |
|---|---|
| maxnoofCSGIds | Maximum no. of CSG Ids within the CSG Id List. Value is 256. |

9.1.8.7 ENB CONFIGURATION UPDATE
This message is sent by the eNB to transfer updated information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB Name | O | | PrintableString(1..150,...) | | YES | ignore |
| Supported TAs | | 0..<maxnoofTACs> | | Supported TAs in the eNB | GLOBAL | reject |
| >TAC | M | | 9.2.3.7 | Broadcasted TAC | - | |
| >Broadcast PLMNs | | 1..<maxnoofBPLMNs> | | Broadcasted PLMNs | - | |
| >>PLMN Identity | M | | 9.2.3.8 | | - | |
| CSG Id List | | 0..1 | | | GLOBAL | reject |
| >CSG Id | M | 1 to <maxnoofCSGIds> | 9.2.1.62 | | - | |
| Default paging DRX | O | | 9.2.1.16 | | YES | ignore |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |

Fig. 7

9.2.aa eNB Identity
*eNB Identity* IE is sent from the eNB to the MME and identifies the eNB.

| IE/Group Name | Presence | Range | IE type and reference | Semantics description |
|---|---|---|---|---|
| eNB Identity | | | OCTET STRING (SIZE(1..255)) | See note below. |

Note:
The octet string shall take form of an Network Access Identifier (NAI) as defined in IETF RFC 4282[13].
The format of the eNB-Identity will be:
0<IMSI>@<realm>
Or
1<OUI>-<SerialNumber>@<realm>
Where <IMSI> is a 16 digit number coded as specified in TS23.003[xx];
and <OUI> and <SerialNumber> are coded as specified in TR-069[xx].

Fig. 8

9.2.bb eNB Environment Information

The *eNB Environment Information* IE is sent from the eNB to MME to provide eNB Environment Information.

| IE/Group Name | Presence | Range | IE type and reference | Semantics description | Criticality | Assigned Criticality |
|---|---|---|---|---|---|---|
| eNB Environment Information | | 1 | | | - | - |
| >Radio Information | O | | 9.2.cc | | - | - |
| >Non Radio Information | O | | 9.2.dd | | - | - |

Fig. 9A

9.2.cc Radio Information

The Radio Information IE is composed of the received information from the surrounding base stations, WiMAX base stations, wireless internet hotspots, television stations, radio stations and GPS.

| IE/Group Name | Presence | Range | IE type and reference | Semantics description |
|---|---|---|---|---|
| *E-UTRAN Cell ID Information* | O | 1..<maxnoof RadioInfo> | | |
| >TAC | M | | 9.2.3.7 | |
| >PLMN-ID | M | | 9.2.3.8 | |
| >Cell Identity | M | | BIT STRING (28) | The leftmost bits of the Cell Identity correspond to the eNB ID (defined in sub clause 9.2.1.37) |
| >Received Signal Strength | M | | 9.2.xx | |
| *UTRAN Cell ID Information* | O | 1..<maxnoofR adioInfo> | | |
| >LAC | M | | 9.2.xx | |
| >RAC | M | | 9.2.xx | |
| >URA identity list | M | 1..<MaxURA> | 9.2.xx | |
| >>URA identity | M | | URA identity 9.2.xx | |
| >PLMN-ID | M | | 9.2.xx | |
| >Cell-ID | M | | 9.2.xx | |
| >Received Signal Strength | M | | 9.2.xx | |
| *GERAN Cell ID Information* | O | 1..<maxnoofR adioInfo> | | |
| >PLMN-ID | M | | 9.2.xx | |
| >LAC | M | | 9.2.xx | 0000 and FFFE not allowed |
| >CI | M | | OCTET STRING (2) | |
| >Received Signal Strength | M | | 9.2.xx | |
| *WiMAX base stations Information* | O | 1..<maxnoofR adioInfo> | | |
| >BSID | M | | 9.2.xx | |
| >Paging Group ID | M | | 9.2.xx | |
| >Received Signal Strength | M | | 9.2.xx | |
| *Wireless Internet hotspots Information* | | 1..<maxnoofR adioInfo> | | |
| >BSSID | M | | 9.2.xx | |
| >ESSID | M | | 9.2.xx | |
| >Received Signal Strength | M | | 9.2.xx | |

Fig. 9B

| | | | | |
|---|---|---|---|---|
| *Television stations Information* | O | 1..<maxnoofRadioInfo> | 9.2.xx | |
| >TV Frequency | M | | 9.2.xx | |
| >Received Signal Strength | M | | 9.2.xx | |
| *Radio stations Information* | O | 1..<maxnoofRadioInfo> | 9.2.xx | |
| >Radio Frequency | M | | 9.2.xx | |
| >Received Signal Strength | M | | 9.2.xx | |
| *GPS Information* | O | 1..<maxnoofRadioInfo> | | |
| >Geographical Coordinates | M | | | |
| >>Latitude Sign | M | | ENUMERATED (North, South) | |
| >>Degrees Of Latitude | M | | INTEGER (0..$2^{23}$-1) | The IE value (N) is derived by this formula: $N \leq 2^{23} \times X / 90 < N+1$ X being the latitude in degree (0°..90°) |
| >>Degrees Of Longitude | M | | INTEGER (-$2^{23}$..$2^{23}$-1) | The IE value (N) is derived by this formula: $N \leq 2^{24} \times X / 360 < N+1$ X being the longitude in degree (-180°..+180°) |
| >Altitude and Direction | M | | | |
| >>Direction of Altitude | M | | ENUMERATED (Height, Depth) | |
| >>Altitude | M | | INTEGER (0..$2^{15}$-1) | The relation between the value (N) and the altitude (a) in meters it describes is $N \leq a < N+1$, except for $N=2^{15}-1$ for which the range is extended to include all greater values of (a). |

| Range bound | Explanation |
|---|---|
| maxnoofRadioInfo | Maximum no. of reported information. Value is xx. |

Fig. 10

9.2.dd   Non Radio Information

This IE indicates non radio information such as IP address, phone number of the fixed line, address, postcode, and, if any, the identifier of the previously connected HeNB-GW.

| IE/Group Name | Presence | Range | IE type and reference | Semantics description |
|---|---|---|---|---|
| CHOICE *IP Address* | O | | | |
| >*IPV4* | | | | |
| >>Internet Address ipv4 | M | | OCTET STRING(4) | |
| >*IP6* | | | | |
| >>Internet Address ipv6 | M | | OCTET STRING(16) | |
| Phone number | O | | 9.2.xx | |
| Address | O | | 9.2.xx | |
| Postcode | O | | 9.2.xx | |
| HeNB-GW Id | O | | 9.2.xx | |

Fig. 13
9.1.6 PAGING
This message is sent by the MME and is used to page a UE in one or several tracking areas.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1..<maxno ofTAIs> | | | EACH | ignore |
| >>TAI | M | | 9.2.3.16 | | - | |
| CSG Id List | | 0..1 | | | GLOBAL | ignore |
| >CSG Id | | 1 to <maxnoof CSGids> | 9.2.1.62 | | - | |
| Paging Priority | O | | 9.2.1.78 | | YES | ignore |
| QCI Info | O | 0 to 255 | | | | |
| Service Type Info | O | | 9.2.xx | | | |
| Calling Party Type Info | O | | 9.2.yy | | | |

| Range bound | Explanation |
|---|---|
| maxnoofTAIs | Maximum no. of TAIs. Value is 256. |
| maxnoofCSGIds | Maximum no. of CSG Ids within the CSG Id List. Value is 256. |

Fig. 14
9.2.xx Service Type Info
The purpose of the *Service Type Info* IE is to indicate the type of service.

| IE/Group Name | Presence | Range | IE type and reference | Semantics description |
|---|---|---|---|---|
| Service Type Info | | | | |
| >Service | M | | ENUMERATED(E-mail, VoIP) | |

Fig. 15
9.2.yy Calling Party Type Info
The purpose of the *Calling Party Type Info* IE is to indicate the type of calling party.

| IE/Group Name | Presence | Range | IE type and reference | Semantics description |
|---|---|---|---|---|
| Calling Party Type Info | | | | |
| >Calling Party | M | | ENUMERATED(Human, Machine, ...) | |

GATEWAY DEVICE, MOBILE COMMUNICATION SYSTEM, AND PAGING METHOD

CROSS-REFERENCE TO RELATED APPLICATIONS

This application is a national stage application of International Application No. PCT/JP2013/005487 entitled "Gateway Device, Mobile Communication System, and Paging Method," filed on Sep. 17, 2013, which claims the benefit of the priority of Japanese Patent Application No. 2012-210767, filed on Sep. 25, 2012, the disclosures of each of which are hereby incorporated by reference in their entirety.

TECHNICAL FIELD

The present invention relates to a gateway device, a mobile communication system, and a paging method.

BACKGROUND ART

In a mobile communication system, when a call is placed to a terminal, it is necessary to inform the terminal that the call is placed to the terminal. The network of the mobile communication system manages the location information of each terminal as the location registration area of the terminal. The network informs each of the terminals in the location registration area where the terminal is registered that the call is placed to the terminal. This procedure is called paging (see, for example, Non-Patent Literature 1).

In general, paging optimization is required in the mobile communication system. In a mobile communication system of the Long Term Evolution (LTE) defined by the Third Generation Partnership Project (3GPP), for example, a method of staggered paging is suggested (Non-Patent literature 2). In the LTE, a radio base station (eNB: eNodeB) that executes paging is determined based on a Tracking Area Identity (TAI) List. Accordingly, when a large number of TAIs are included in the TAI List, all the radio base stations having the TAIs need to execute paging. Non-Patent literature 2 suggests a method for determining and paging, by the MME, a specific Tracking Area (TA) or a radio base station as a subset of a TA group based on presence information of the terminal (e.g., information of Tracking Area Update (TAU) which the terminal has recently executed).

Incidentally, in a recent mobile communication system, there is a case in which a small-sized radio base station called a femto base station has been newly introduced in addition to the existing radio base stations to provide services of a femto cell. In the LTE mobile communication system, the femto base station is called a Home evolved Node B (HeNB). The area of the cell covered by the femto base station is typically about several meters in radius to several tens of meters in radius. Further, a large number of femto base stations are often installed in the system. Further, in the LTE architecture, a Home evolved Node B Gateway (HeNB-GW) may be optionally installed between the HeNB and a Mobility Management Entity (MME) which is a core network node higher than the HeNB. The use of an interface between the HeNB, and the MME and the HeNB-GW is specified in Non-Patent literature 3 as the S1 Application Protocol (S1AP).

CITATION LIST

Non-Patent Literature

[Non-Patent literature 1] Keiji Tachikawa, "W-CDMA Mobile Communication Systems", Maruzen Company, Limited, pp. 254-256
[Non-Patent literature 2] R3-082983 3GPP TSG-RAN-WG3 Meeting #62 http://www.3gpp.org/ftp/tsg_ran/WG3_Iu/TSGR3_62/docs/R3-082983.zip
[Non-Patent literature 3] Evolved Universal Terrestrial Radio Access Network (E-UTRAN); S1 Application Protocol (S1AP) [3GPP TS36.413 v10.3.0]

SUMMARY OF INVENTION

Technical Problem

The present inventors have found the following problems in the aforementioned background.

In Non-patent literature 2, as described above, paging can be executed on only one radio base station which belongs to a TA in which UE is registered. When the femto base station is used, however, the service area is small, and UE may have moved outside the area at the time that paging is performed. Further, in the case in which all the radio base stations that belong to one TA need to execute paging, the effect of the paging optimization may be small. It is therefore impossible to gradually adjust the number of radio base stations and the range in which paging is executed.

An exemplary object of the present invention is to provide a gateway device, a mobile communication system, and a paging method capable of solving the above problems.

Solution to Problem

In order to achieve the above object, a gateway device according to the present invention includes: a memory that stores information regarding an environment around a radio base station; a controller that generates a message for paging a mobile station which camps on the radio base station to execute processing for determining information of a radio base station to which the message is transmitted based on the stored information; and a transmission unit that transmits the message.

Further, a mobile communication system according to the present invention includes a radio base station and a gateway device that communicates with the radio base station, in which: the radio base station transmits information regarding an environment around the radio base station to the gateway device, and the gateway device includes: a reception unit that receives the information; a controller that generates a message for paging a mobile station which camps on the radio base station to execute processing for determining a radio base station to which the message is transmitted based on the received information; and a transmission unit that transmits the message.

Further, a paging method according to the present invention includes the steps of: storing information regarding an environment around a radio base station; generating a message for paging a mobile station which camps on the radio base station to execute processing for determining a radio base station to which the message is transmitted based on the stored information; and transmitting the message to the radio base station to which the message is transmitted.

Advantageous Effects of Invention

According to the present invention, it is possible to achieve paging optimization by reducing the number of radio base stations that execute paging.

BRIEF DESCRIPTION OF DRAWINGS

FIG. 2 is a sequence diagram showing an operation according to the first exemplary embodiment;

FIG. 3 is a diagram showing a configuration according to a second exemplary embodiment;

FIG. 5 is one example of information transmitted by an HeNB to an HeNB-GW according to the second exemplary embodiment;

FIG. 6 is one example of information transmitted by the HeNB to the HeNB-GW according to the second exemplary embodiment;

FIG. 7 is one example of information transmitted by the HeNB to the HeNB-GW according to the second exemplary embodiment;

FIG. 8 is one example of information transmitted by the HeNB to the HeNB-GW according to the second exemplary embodiment;

FIG. 9A is one example of information transmitted by the HeNB to the HeNB-GW according to the second exemplary embodiment;

FIG. 9B is one example of information transmitted by the HeNB to the HeNB-GW according to the second exemplary embodiment;

FIG. 10 is one example of information transmitted by the HeNB to the HeNB-GW according to the second exemplary embodiment;

FIG. 13 is one example of information transmitted by an MME to an HeNB-GW according to the fourth exemplary embodiment;

FIG. 14 is one example of information transmitted by the MME to the HeNB-GW according to the fourth exemplary embodiment;

FIG. 15 is one example of information transmitted by the MME to the HeNB-GW according to the fourth exemplary embodiment.

DESCRIPTION OF EMBODIMENTS

Hereinafter, with reference to the drawings, exemplary embodiments of the present invention will be described.

First Exemplary Embodiment

[Configuration]

Figure 1:
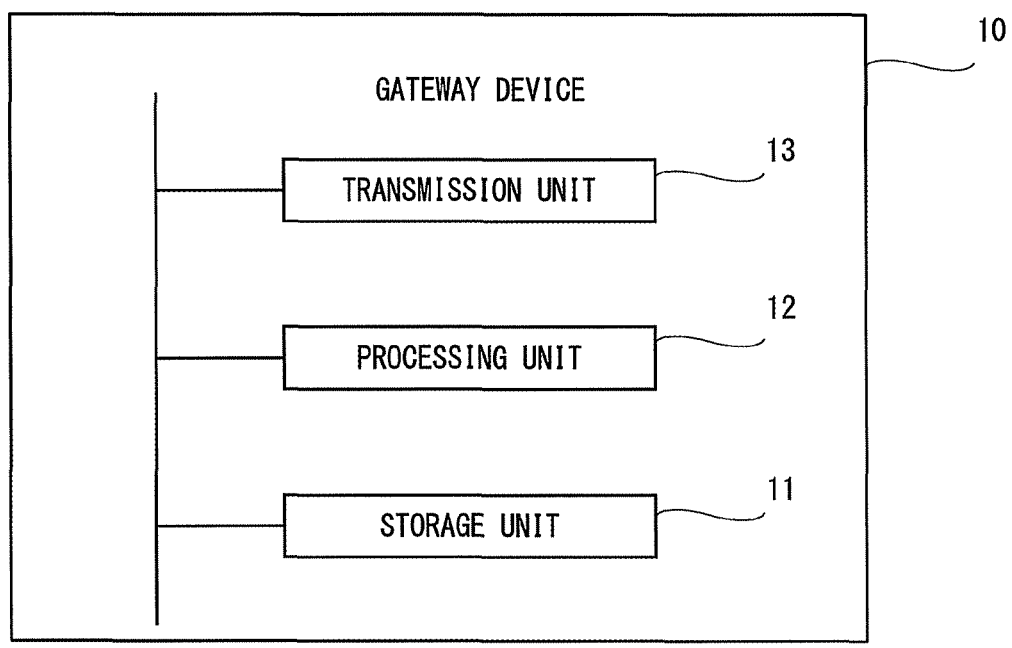
FIG. 1 is a diagram showing a configuration according to a first exemplary embodiment.

FIG. 1 is a diagram showing one example of the configuration of a gateway device 10 according to a first exemplary embodiment of the present invention. As shown in FIG. 1, the gateway device 10 includes a storage unit 11, a processing unit 12, and a transmission unit 13.

The storage unit 11 stores information regarding an environment around radio base stations (not shown). The processing unit 12 determines, based on the information regarding the environment around the radio base station on which the mobile station has camped, a radio base station to which a message to page the mobile station is transmitted. The transmission unit 13 transmits the paging message to the radio base station determined in the processing unit 12.

[Operations]

FIG. 2 is a diagram showing one example of the sequence indicating the operations of the gateway device 10 according to the first exemplary embodiment.

First, the gateway device 10 stores information regarding the environment around the radio base station in the storage unit 11 (S11). Next, the gateway device 10 determines by the processing unit 12 the radio base station to which the paging message is transmitted based on the information regarding the environment around the radio base station on which the mobile station has camped (S12). Lastly, the gateway device 10 transmits by the transmission unit 13 the paging message to the radio base station that is determined in S12.

[Effects]

As described above, the gateway device 10 determines the radio base station to which the paging message is transmitted based on environment information around the radio base station on which the mobile station has camped. It is therefore possible to reduce the number of radio base stations that execute paging and to achieve paging optimization.

Second Exemplary Embodiment

[Configuration]

FIG. 3 is a diagram showing one example of the configuration of a mobile communication system according to a second exemplary embodiment of the present invention. As shown in FIG. 3, the mobile communication system includes an HeNB-GW 100, an MME 200, an HeNB 300, an HeNB 310, an HeNB 320, an HeNB 330, and a UE 400.

The HeNB-GW 100 includes a transmission/reception unit 101, a processing unit 102, and a storage unit 103. The HeNB-GW 100 is able to communicate with the HeNB 300, the HeNB 310, and the HeNB 320, and transmits or receives messages using S1AP to or from the HeNB 300, the HeNB 310, and the HeNB 320. The HeNB-GW 100 also transmits or receives messages using S1AP to or from the MME 200 as well. In the HeNB-GW 100, the transmission/reception unit 101 performs processing for transmitting or receiving information, the processing unit 102 performs processing for generating and analyzing information to be transmitted or received, and the storage unit 103 performs processing for storing information to be transmitted or received.

The MME 200 includes a transmission/reception unit 201, a processing unit 202, and a storage unit 203. The MME 200 transmits or receives messages using S1AP to or from the HeNB-GW 100 described above, and is able to communicate with the HeNB 330 using S1AP without the intervention of the HeNB-GW 100. In the MME 200, the transmission/reception unit 201 performs processing for transmitting or receiving information, the processing unit 202 performs processing for generating and analyzing information to be transmitted or received, and the storage unit 203 performs processing for storing information to be transmitted or received.

The HeNB 300 includes a transmission/reception unit 301, a processing unit 302, and a storage unit 303. The same is true for the HeNB 310, the HeNB 320, and the HeNB 330. Some HeNBs such as the HeNB 330 communicate with the MME 200 as an upper node and other HeNBs such as the HeNB 300, the HeNB 310, and the HeNB 320 communicate with the HeNB-GW 100 as an upper node. The HeNBs transmit or receive messages using S1AP to or from the upper nodes. The HeNB 300 is further able to communicate with the UE 400 by radio, and the interface between them is defined as Uu. In the HeNB 300, the transmission/reception unit 301 performs processing for transmitting or receiving information, the processing unit 302 performs processing for generating and analyzing information to be transmitted or received, and the storage unit 303 performs processing for storing information to be transmitted or received. The same is true for the HeNB 310, the HeNB 320, and the HeNB 330.

The UE 400 includes a transmission/reception unit 401, a processing unit 402, and a storage unit 403. The UE 400 performs radio communication with the HeNB 300, as described above. In the UE 400, the transmission/reception unit 401 performs processing for transmitting or receiving information, the processing unit 402 performs processing for generating and analyzing information to be transmitted or received, and the storage unit 403 performs processing for storing information to be transmitted or received.

[Operations]

Figure 4A:
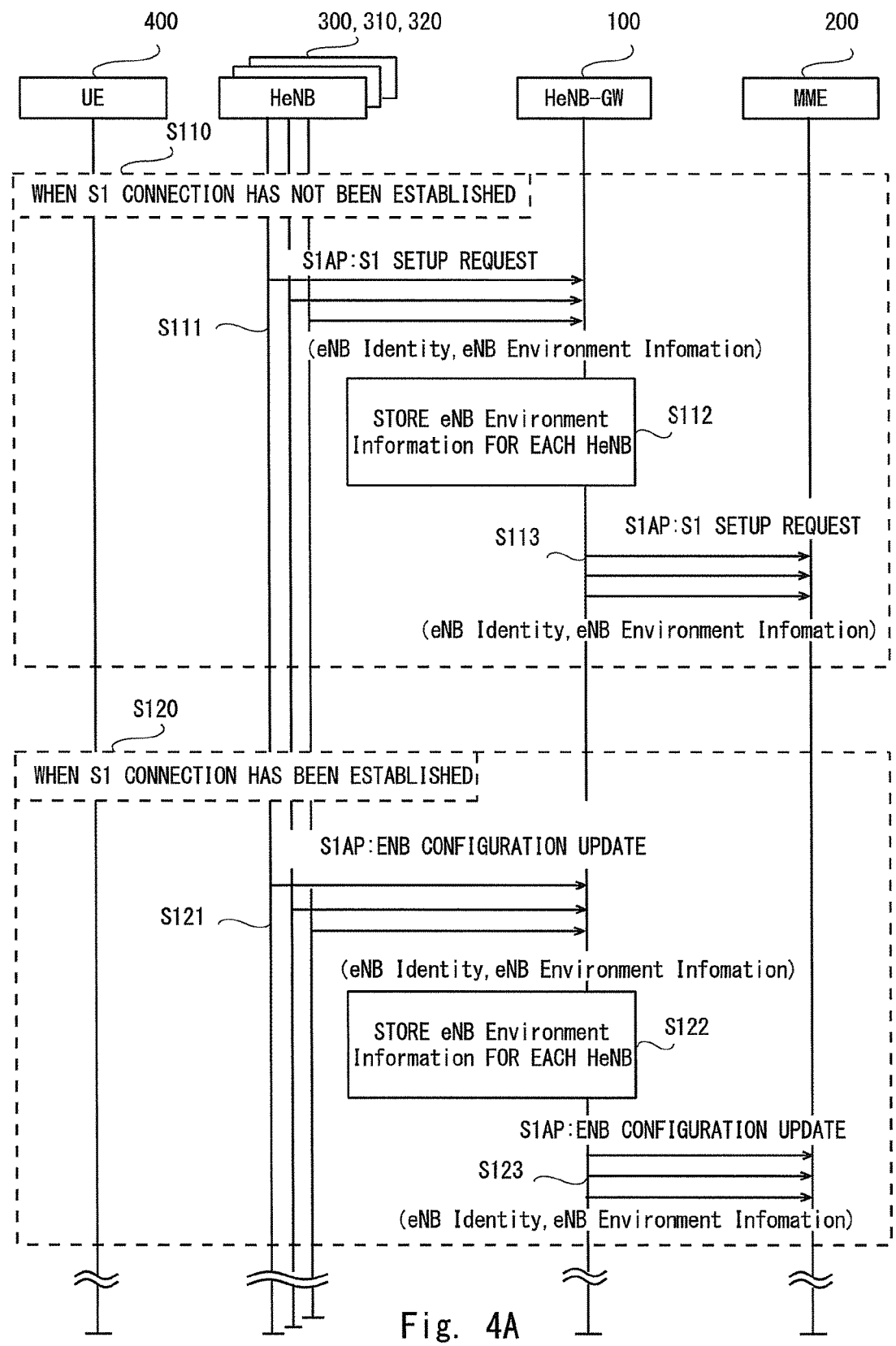
FIG. 4A is a sequence diagram showing an operation according to the second exemplary embodiment.
Figure 4B:
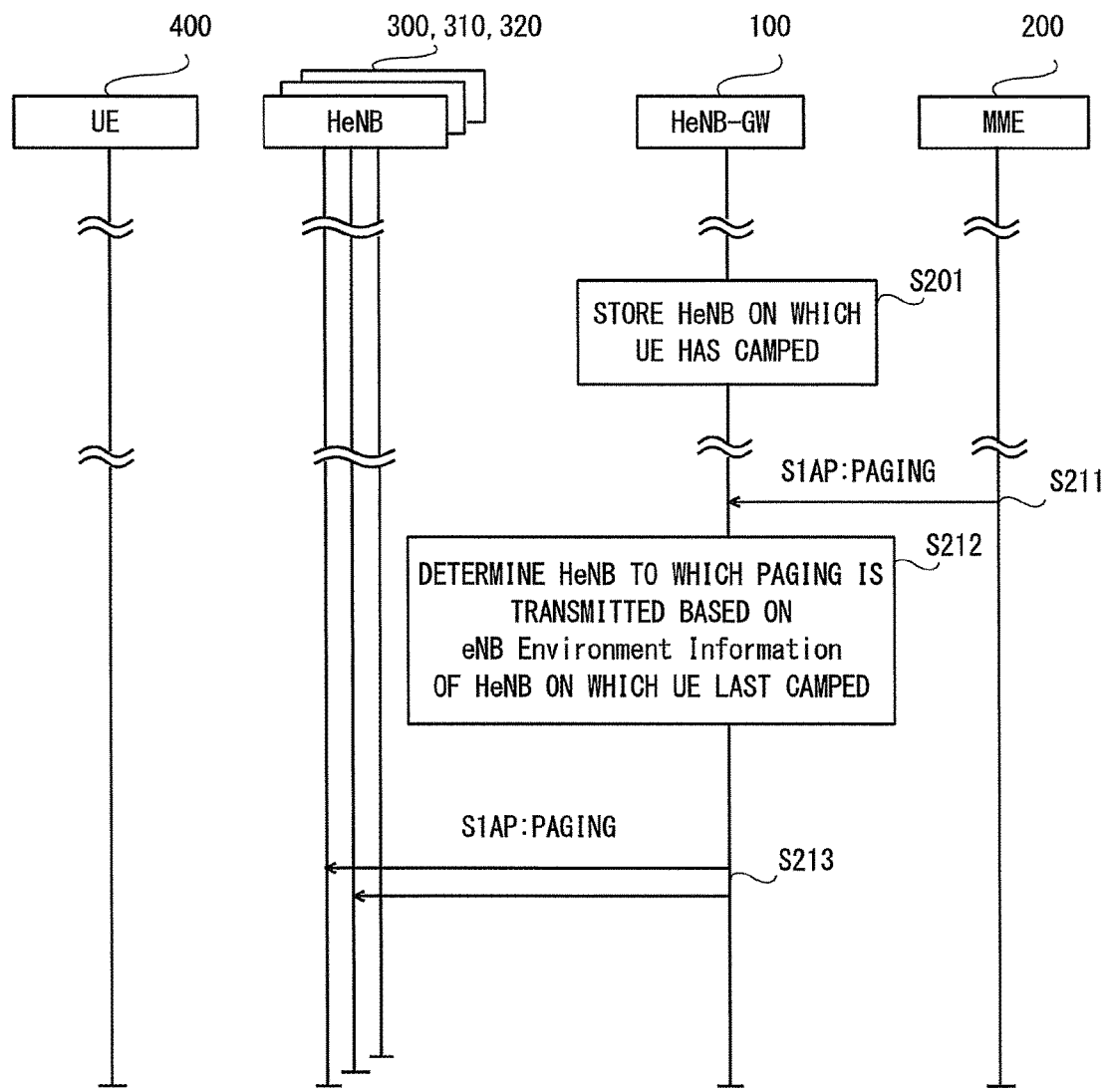
FIG. 4B is a sequence diagram showing the operation according to the second exemplary embodiment.

FIGS. 4A and 4B are diagrams showing an example of the sequence of the operation according to the second exemplary embodiment of the present invention. Hereinafter, with reference to the drawings, the operations of the HeNB 300, the HeNB-GW 100, and the MME 200 will be described.

First, with reference to FIG. 4A, an operation flow when the S1 connection between the HeNB 300 and the HeNB-GW 100 has not been established will be described (S110). The HeNB 300 transmits an S1 SETUP REQUEST message to the HeNB-GW 100 (S111). The HeNB 310 and the HeNB 320 operate in a way similar to that of the HeNB 300. This message is a message that is transmitted to the HeNB-GW by the HeNB for the first time after the connection of a transport network layer (TNL) becomes available to establish the S1 connection, and the details of the message are disclosed in Non-patent literature 3. The HeNB 300 notifies, by the message, the HeNB-GW 100 of eNB Identify which is identification information of the radio base station and eNB Environment Information which is the information regarding the environment around the radio base station. The details of these information will be described later. Next, the HeNB-GW 100 which has received the message stores eNB Environment Information of each HeNB (S112). The HeNB-GW 100 then transmits the received message to the MME 200 (S113).

Meanwhile, the operation flow when the S1 connection between the HeNB 300 and the HeNB-GW 100 has already been established will be described (S120). The HeNB 300 transmits an ENB CONFIGURATION UPDATE message to the HeNB-GW 100 (S121). The HeNB 310 and the HeNB 320 operate in a way similar to that of the HeNB 300. The details of the ENB CONFIGURATION UPDATE message is disclosed in Non-patent literature 3. The HeNB 300 notifies, by the message, the HeNB-GW 100 of eNB Identify which is the identification information of the radio base station and eNB Environment Information which is the information regarding the environment around the radio base station. The details of these information will be described later. The following operations of S122 and S123 are similar to those of S112 and S113 described above, and thus the description thereof will be omitted.

With reference to FIGS. 5 to 10, the eNB Identity and the eNB Environment Information described above will be described.

FIG. 5 is a diagram showing one example of the information elements (IEs) of the S1 SETUP REQUEST message. FIG. 6 is a diagram showing one example of the IEs of ENB CONFIGURATION UPDATE. The eNB Identity and the eNB Environment Information included in the both messages will be described below in detail.

FIG. 7 is a diagram showing one example of the details of the IEs included in the eNB Identity. The eNB Identity is an IE for identifying the radio base station.

FIG. 8 is a diagram showing one example of the details of the eNB Environment Information. The eNB Environment Information includes Radio Information which is information regarding a radio environment and Non Radio Information which is information regarding information other than the radio environment.

FIGS. 9A and 9B are diagrams showing one example of the details of the IEs included in the Radio Information. The IE of E-UTRAN Cell ID Information includes various types of information regarding a cell of an Enhanced Universal Terrestrial Radio Access Network (E-UTRAN). The IE of UTRAN Cell ID Information includes various types of information regarding a cell of a Universal Terrestrial Radio Access Network (UTRAN). The IE of GERAN Cell ID Information includes various types of information regarding a cell of a Global System for Mobile Communications EDGE Radio Access Network (GERAN). The IE of WiMAX base stations Information includes various types of information regarding the base station of a Worldwide Interoperability for Microwave Access (WiMAX). The IE of Wireless Internet hotspots Information includes various types of information regarding a wireless Internet hotspot. The IE of Television stations Information includes various types of information regarding TV stations. The IE of Radio Stations Information includes various types of information regarding radio stations. The IE of GPS Information includes various types of information regarding a Global Positioning System (GPS). The information regarding the GPS includes, as shown in FIG. 9B, positional information (e.g., latitude, longitude, and altitude). However, these information are not necessarily limited to information acquired using the GPS mounted on the radio base station. They may be set by an Operation and Maintenance (O&M) apparatus of the radio base station or may be set by a maintenance engineer of the radio base station manually.

FIG. 10 is a diagram showing one example of the details of the IEs included in Non Radio Information. The CHOICE IP Address is an IE indicating the Internet Protocol (IP) address allocated to the radio base station. Phone number, Address, and Postcode are the IEs respectively indicating the telephone number, the address, and the postcode regarding the position in which the radio base station is installed. The HeNB-GW ID is an IE indicating identification information of HeNB-GW to which the HeNB has most recently been connected when the radio base station is HeNB.

With reference to FIG. 4B, the operation flow will be continuously described. The HeNB-GW 100 recognizes which HeNB cell the UE 400 camps on and stores which of the HeNB 300, the HeNB 310, and the HeNB 320 the UE 400 camps on (S201).

Next, the operation flow when paging is executed will be described. The HeNB-GW 100 first receives a PAGING message to page the UE 400 from the MME 200 (S211). The details of the PAGING message are disclosed in Non-patent literature 3.

Subsequently, the HeNB-GW 100 determines the HeNB to which the PAGING message is transmitted based on the eNB Environment Information stored in S112 or S122 regarding HeNB stored in S201 (S212). Consider, for example, a case in which the HeNB on which the UE 400 last camped is the HeNB 300. When the HeNB 310 includes the eNB Environment Information that is similar to that included in the HeNB 300, the HeNB-GW 100 determines the HeNB to which the PAGING message is transmitted as the HeNB 300 and the HeNB 310.

To be more specific, regarding the latitude and the longitude in GPS Information of eNB Environment Information, for example, when only the HeNB 310 has values close to those of the HeNB 300, the HeNB to which the PAGING message is transmitted is determined to be the HeNB 310 and the HeNB 300. Alternatively, the HeNB to which the PAGING message is transmitted may be determined using values of a postcode, a telephone number, or an address in a similar way that the information of latitude and longitude is used. Alternatively, the HeNBs having similar IP address values may be determined as the HeNBs to which the PAGING message is transmitted. Whether the HeNBs have similar IP address values may be determined based on whether the HeNBs have similar IP address values in the address space. Further, when a provider that allocates the IP addresses determines the values of the IP addresses on the basis of regional features, these values may be used. Further, the IP address of each HeNB allocated when a Security Architecture for Internet Protocol (IPsec) tunnel has been established may be stored, and the HeNB to which the PAGING message is transmitted may be determined based on the IP address of the HeNB on which the UE last camped. As described above, the HeNB-GW 100 may determine the HeNB to which the PAGING message is transmitted based on any information element shown in FIGS. 8 to 10 or may determine the HeNB to which the PAGING message is transmitted from a result of a conditional judgment using a combination of a plurality of information elements.

Next, the HeNB-GW 100 transmits the PAGING message to the HeNB that is determined in S212 (S213).

[Effects]

As described above, the HeNB-GW according to the first exemplary embodiment transmits the paging message to the HeNB that includes information regarding a surrounding environment close to the information regarding the environment around the HeNB on which the UE which is the paging target last camped. Accordingly, even when UE has already moved from the area of the HeNB on which the UE last camped, peripheral HeNBs perform paging. Therefore, it is highly likely that the paging succeeds. In addition, compared to the case in which the HeNB-GW transmits the paging message to all the HeNBs having TAI based on the TAI List, the number of messages can be reduced, and it is possible to achieve paging optimization.

By appropriately changing the range of the values of eNB Environment Information, which is a determination criterion when the HeNB is determined in S212, it is possible to gradually adjust the number and the range of the HeNBs that execute paging.

Third Exemplary Embodiment

[Configuration]

Since the configuration of a mobile communication system according to a third exemplary embodiment is similar to that in the second exemplary embodiment, the description thereof will be omitted.

[Operations]

Figure 11A:
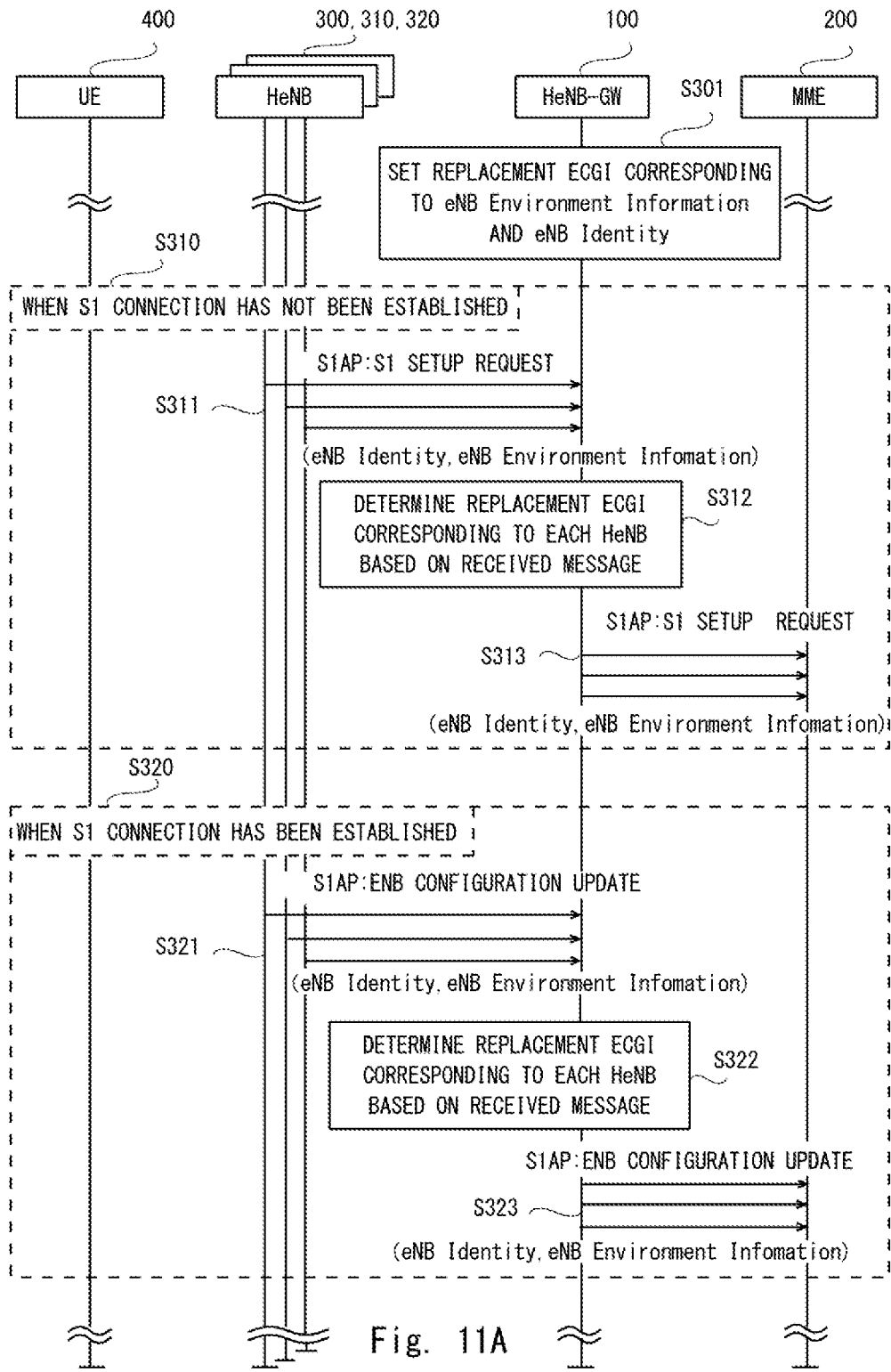
FIG. 11A is a sequence diagram showing an operation according to a third exemplary embodiment.
Figure 11B:
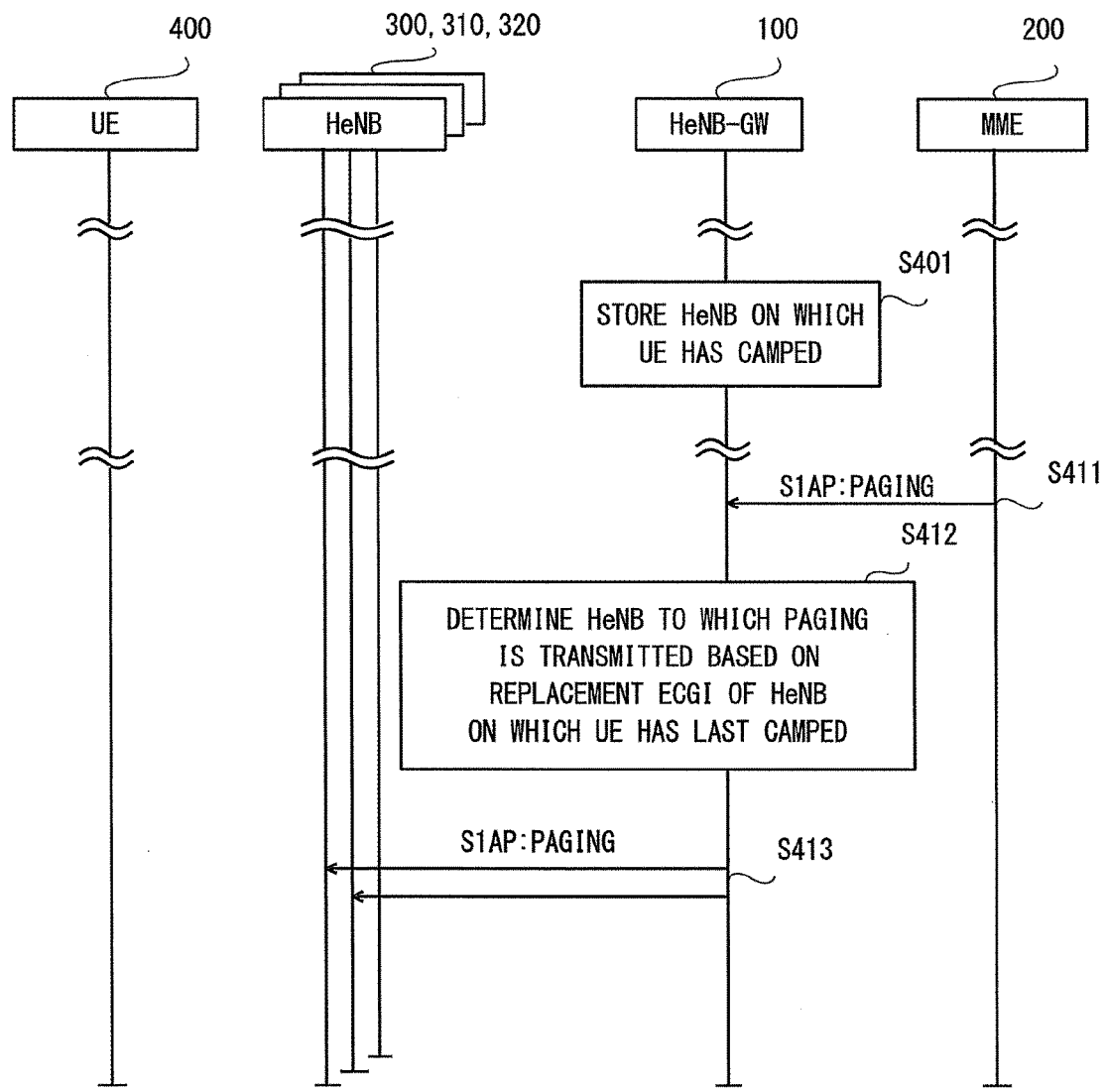
FIG. 11B is a sequence diagram showing the operation according to the third exemplary embodiment.

FIGS. 11A and 11B are diagrams showing an example of the sequence of the operation according to the third exemplary embodiment of the present invention. In the following description, with reference to the drawings, the operations of the HeNB 300, the HeNB-GW 100, and the MME 200 will be described.

First, in FIG. 11A, the HeNB-GW 100 stores information for associating a predetermined value of at least one of eNB Identity and eNB Environment Information with a predetermined value of a replacement ECGI in the HeNB-GW 100 (S301). The ECGI (E-UTRAN Cell Global Identifier) is an identifier of the cell having different values for the respective HeNBs. The replacement ECGI is an identifier which serves as a replacement of the ECGI, and the ECGIs of the plurality of HeNBs and one replacement ECGI may be associated with each other. Note that the HeNB-GW 100 may acquire the information regarding the correspondence from another device via a network or may acquire the information regarding the correspondence by setting by the maintenance engineer. Any desired method may be used. Further, regarding the correspondence, for example, a value A1 or A2 of eNB Identity and a value X1 of the replacement ECGI may be associated with each other. Alternatively, values B1 to B5 of the predetermined information element of eNB Environment Information and a value X2 of the replacement ECGI may be associated with each other. Further alternatively, a value A3 of eNB Identity and a value B6 of the predetermined information element of eNB Environment Information may be associated with a value X3 of the replacement ECGI. The value of eNB Identity and the value of the predetermined information element of eNB Environment Information may be combined to associate the combined value with the replacement ECGI.

The following operation is different between the case in which the S1 connection between the HeNB 300 and the HeNB-GW 100 has been established (S320) and the case in which the S1 connection has not been established (S310). These two cases will be separately described.

When the S1 connection has not been established (S310), the HeNB 300 transmits the S1 SETUP REQUEST message to the HeNB-GW 100 (S311). Since this operation is similar to that in the second exemplary embodiment, the detailed description will be omitted. Next, the HeNB-GW 100 determines, for each HeNB that has transmitted the message, the corresponding ECGI based on the S1 SETUP REQUEST message that the HeNB-GW 100 received (S312). When, for example, the value of eNB Identity included in the message is A2, the value of the replacement ECGI in the above example is determined to be X1. In a similar way, when the value of the predetermined information element of eNB Environment Information is B1, the replacement ECGI is determined to be X2. Further, when the value of eNB Identity is A3 and the value of the predetermined information element of eNB Environment Information is B6, the replacement ECGI is determined to be X3. The HeNB-GW 100 may use both of eNB Identity and eNB Environment Information or may use only one of eNB Identity and eNB Environment Information to determine the replacement ECGI. Next, the HeNB-GW 100 transmits the received message to the MME 200 (S313).

Next, the operation flow when the S1 connection has already been established between the HeNB 300 and the HeNB-GW 100 will be described (S320). The HeNB 300 transmits an ENB CONFIGURATION UPDATE message to the HeNB-GW 100 (S321). Since this operation is similar to that in the second exemplary embodiment, the detailed description will be omitted. Next, the HeNB-GW 100 determines, for each HeNB that has transmitted the message, the corresponding ECGI based on the ENB CONFIGURATION UPDATE message that the HeNB-GW 100 receives (S322). Since this operation is similar to that in S312, the description thereof will be omitted. Next the HeNB-GW 100 transmits the received message to the MME 200 (S323).

With reference next to FIG. 11B, the operation flow will be described. The HeNB-GW 100 recognizes which HeNB cell the UE 400 camps on, and stores which of the HeNB 300, the HeNB 310, and the HeNB 320 the UE 400 camps on (S401). This operation is similar to that in the second exemplary embodiment.

Next, the operation flow when the paging is executed will be described. First, the HeNB-GW 100 receives from the MME 200 the PAGING message to page the UE 400 (S411).

Next, the HeNB-GW 100 determines the HeNB to which the PAGING message is transmitted based on the replacement ECGI determined in S312 or S322 regarding the HeNB stored in S401 (S412). Consider, for example, a case in which the HeNB 300 is the HeNB that the UE 400 last camped on. When the value of the replacement ECGI of the HeNB 300 is the same as that of the replacement ECGI of the HeNB 310 and is different from that of the replacement ECGI of the HeNB 320, the HeNB-GW 100 determines the HeNB to which the PAGING message is transmitted as the HeNB 310 and the HeNB 300.

Next, the HeNB-GW 100 transmits the PAGING message to the HeNB that is determined in S412 (S413).

[Effects]

As described above, the HeNB-GW according to the third exemplary embodiment transmits the paging message to the HeNB having the value of the replacement ECGI which is equal to the value of the replacement ECGI of the HeNB on which the UE which is the paging target last camped. Further, the HeNBs having similar information regarding the environment around the HeNBs have the same replacement ECGI. Accordingly, the invention according to the third exemplary embodiment achieves the effects similar to those of the invention according to the second exemplary embodiment.

Further, it is required in the second exemplary embodiment that the HeNB-GW performs processing for determining the HeNB to which the PAGING message is transmitted based on the environment information around the HeNB on which the UE last camped when the paging message is received from the MME. In the third exemplary embodiment, however, before the HeNB-GW receives the paging message from the MME, the HeNB-GW has already created and stored another identifier based on the information regarding the environment around the HeNBs, whereby it is possible to determine the HeNB to which the PAGING message is transmitted using this identifier.

Fourth Exemplary Embodiment

The invention according to a fourth exemplary embodiment executes the operation for optimizing paging in the second and third exemplary embodiments only when a predetermined condition is satisfied. While it is required to reduce the number of paging messages as stated above, another problem occurs if a large number of paging messages are deleted. When paging in the deleted paging message does not succeed since the UE moves away from the radio base station on which the UE last camped on, for example, normal paging based on the TAI List is executed again, which causes a problem of service delay. In some cases like voice communication, re-execution of the paging is detrimental to user's experiences. In other cases like mail reception or Machine-to-Machine (M2M) communication, the re-execution of the paging is less detrimental to user's experiences. The present invention according to this exemplary embodiment solves the above problem.

[Configuration]

Since the configuration of the mobile communication system according to the fourth exemplary embodiment is similar to that of the second exemplary embodiment, the description thereof will be omitted.

[Operations]

Figure 12:
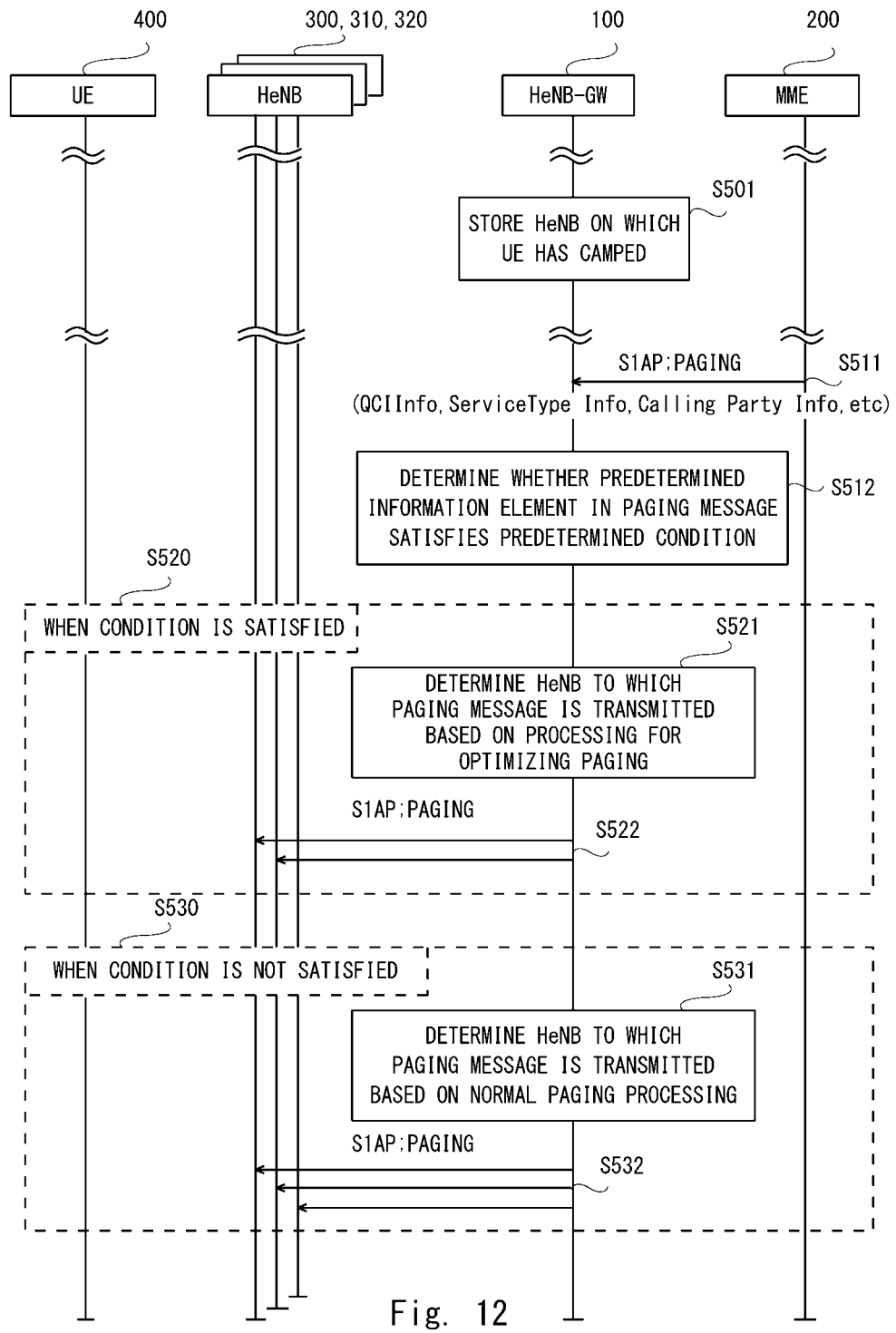
FIG. 12 is a sequence diagram showing an operation according to a fourth exemplary embodiment.

FIG. 12 is a diagram showing one example of the sequence of the operation according to the fourth exemplary embodiment of the present invention. In the following description, with reference to the drawings, the operations of the HeNB 300, the HeNB-GW 100, and the MME 200 will be described.

In this exemplary embodiment, the operation of FIG. 4A or FIG. 11A is executed before the operation of FIG. 12 is executed. Since these operations are similar to those in the second exemplary embodiment or the third exemplary embodiment, the description thereof will be omitted.

First, the HeNB-GW 100 recognizes which HeNB cell the UE 400 camps on, and stores which of the HeNB 300, the HeNB 310, and the HeNB 320 the UE 400 camps on (S501). This operation is similar to that in the second exemplary embodiment.

Next, the operation flow when the paging is executed will be described. First, the HeNB-GW 100 receives the PAGING message to page the UE 400 from the MME 200 (S511).

FIGS. 13 to 15 are diagrams showing examples of the information element of the PAGING message. FIG. 14 defines the details of Service Type Info which is the information element of FIG. 13, and FIG. 15 defines the details of Calling Party Type Info, as is similar to FIG. 14. The details of the information element will be described later.

Next, the HeNB-GW 100 determines whether the value of the predetermined information element included in the PAGING message satisfies a predetermined condition (S512). When the value of the predetermined information element satisfies the predetermined condition, paging is optimized (S520). When the value of the predetermined information element does not satisfy the predetermined condition, the normal paging operation is performed (S530).

The information element used for the determination in S512 may be, for example, QCI Info (QoS Class Identifier), which is the information indicating the class of the Quality of Service (QoS). In this case, when the value of the QCI Info indicates Transmission Control Protocol (TCP)-based, for example, it is determined in S512 that the condition is satisfied in order to reduce the system load by the paging optimization. The "TCP-based" means, for example, World Wide Web (WWW), e-mail, chat, File Transfer Protocol (ftp), Peer to Peer (p2p) file sharing, progressive video. Meanwhile, when the value of QCI Info indicates Conversational Voice, which is a voice call, it is determined that the condition in S512 is not satisfied in order to avoid the service delay due the re-execution of the paging.

Further, the information element used for the determination in S512 may be Service Type Info, which is the information indicating the service type of the call. In this case, when the value of Service Type Info indicates an e-mail, for example, the service delay due to the re-execution of the paging does not cause a big problem. In such a case, priority is given to the reduction in system load by the paging optimization, and it is determined in S512 that the condition is satisfied. Meanwhile, when the value of Service Type Info indicates Voice over Internet Protocol (VoIP), it is determined in S512 that the condition is not satisfied to avoid the service delay due the re-execution of the paging.

Furthermore, the information element used for the determination in S512 may be Calling Party Type Info, which is information indicating the type of a calling party. In this case, when the value of Calling Party Type Info indicates Machine, for example, the service delay does not cause a big problem even when paging is executed again. In such a case, priority is given to the reduction in system load by the paging optimization, and it is determined in S512 that the condition is satisfied. Meanwhile, when the value of Calling Party Type Info indicates, for example, Human, it is determined in S512 that the condition is not satisfied to avoid the service delay due to the re-execution of the paging.

Further, a conditional judgment may be carried out in S512 based on Paging Priority, which is the information element indicating the priority of the paging. Further, the information element illustrated above may be used alone for the conditional judgment, or a plurality of information elements may be used in combination with each other for the conditional judgment.

Next, the operation in the case in which it is determined in S512 that the condition is satisfied will be described (S520). The HeNB-GW 100 determines the HeNB to which the PAGING message is transmitted based on processing for optimizing the paging (S521) and transmits the message to the HeNB that is determined (S522). More specifically, the processing for optimizing the paging is similar to the operation of S212 in FIG. 4B in the second exemplary embodiment or the processing of S412 in FIG. 11B in the third exemplary embodiment, and thus the description thereof will be omitted.

Meanwhile, the operation in the case in which it is determined in S512 that the condition is not satisfied will be described (S530). The HeNB-GW 100 determines the HeNB to which the PAGING message is transmitted based on normal paging processing (S531) and transmits the message to the HeNB that is determined (S532). More specifically, the normal paging processing is processing for determining all the HeNBs having TAI specified by the TAI List which is the information element included in the PAGING message as the HeNBs to which the PAGING message is transmitted.

[Effects]

As described above, the HeNB-GW according to the fourth exemplary embodiment determines, based on the value of the information element included in the paging message received from the MME, whether to execute the processing for optimizing the paging or the normal paging processing. Accordingly, it is possible to avoid occurrence of the service delay due to the re-execution of the paging as a result of the failure in paging by optimization processing according to the type of the paging that is to be executed.

Fifth Exemplary Embodiment

The invention according to a fifth exemplary embodiment further specifies and improves the operation for storing the HeNB on which the UE 400 last camped in the HeNB-GW 100 (i.e., S201 in FIG. 4B, S401 in FIG. 11B, and S501 in FIG. 12) in the second to fourth exemplary embodiments. If the HeNB-GW 100 cannot frequently acquire information of the HeNB on which the UE 400 camps, the operation for optimizing paging is carried out based on old information. In such a case, it is highly likely that the UE 400 has already moved from the area of the HeNB-GW cell on which the UE 400 last camped and paging is failed. The invention according to this exemplary embodiment solves such a problem.

[Configuration]

Since the configuration of the mobile communication system according to the fifth exemplary embodiment is similar to that of the second exemplary embodiment, the description thereof will be omitted.

[Operations]

Figure 16:
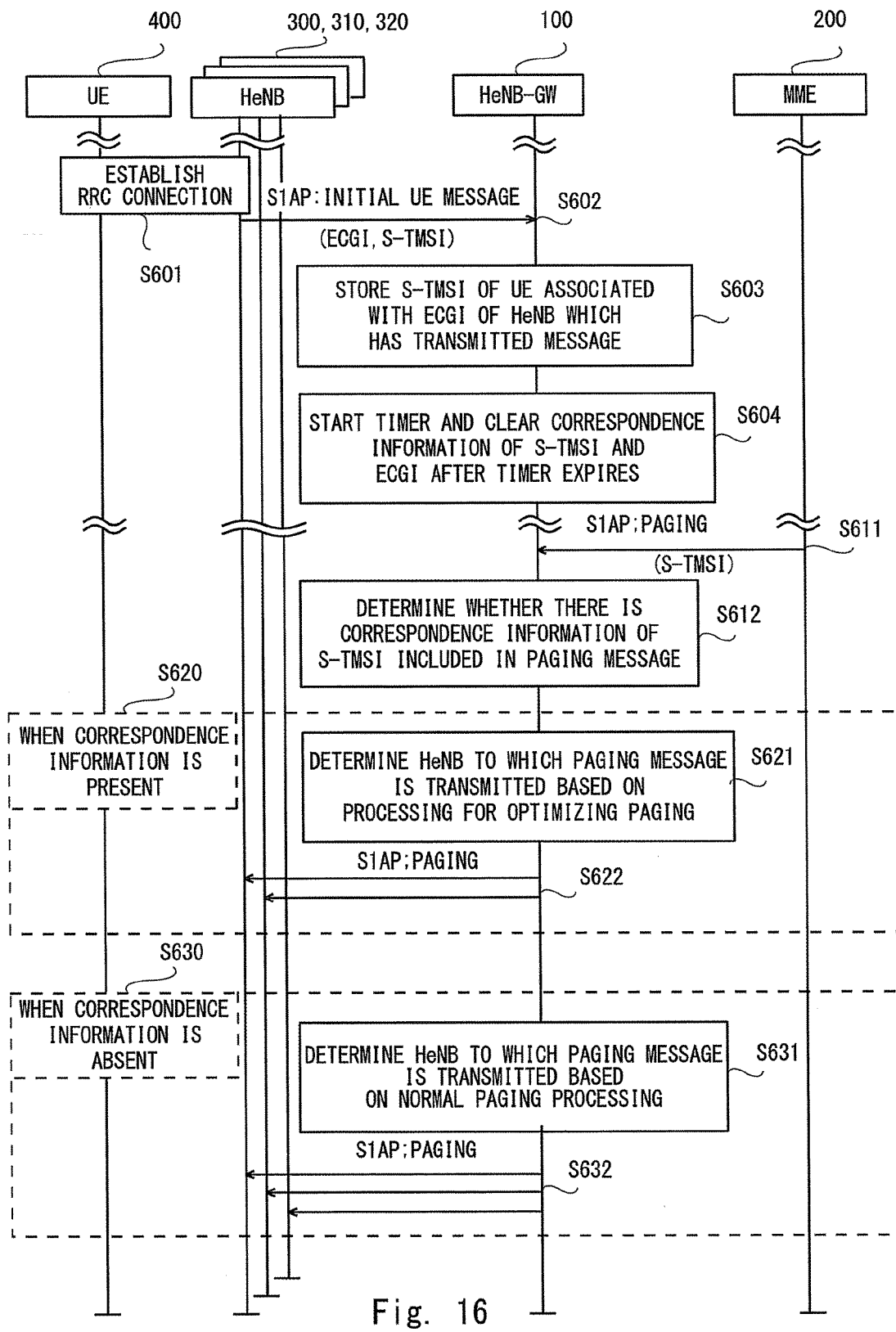
FIG. 16 is a sequence diagram showing an operation according to a fifth exemplary embodiment.

FIG. 16 is a diagram showing one example of the sequence of the operation according to the fifth exemplary embodiment of the present invention. Hereinafter, with reference to the drawing, the operations of the HeNB 300, the HeNB-GW 100, and the MME 200 will be described.

In this exemplary embodiment, the operation of FIG. 4A or FIG. 11A is executed before the operation of FIG. 16 is executed. Since these operations are similar to those in the second exemplary embodiment or the third exemplary embodiment, the description thereof will be omitted.

First, a Radio Resource Control (RRC) connection is established between the UE 400 and the HeNB 300 (S601). Since the details are well-known to one of ordinary skilled in the art and are not directly related to the present invention, the description thereof will be omitted.

Next, the HeNB 300 transmits a message of INITIAL UE MESSAGE to the HeNB-GW 100 (S602). The details of the message of INITIAL UE MESSAGE is disclosed in Non-patent literature 3. This message includes ECGI with which the HeNB 300 can be identified and SAE Temporary Mobile Subscriber Identity (S-TMSI) with which the UE 400 can be identified.

Next, the HeNB-GW 100 stores information in which ECGI and S-TMSI are associated with each other based on the received message (S603). The HeNB-GW 100 is therefore able to recognize the UE 400 and the HeNB 300 on which the UE 400 has camped in association with each other.

Further, the HeNB-GW 100 starts a timer, and clears information of correspondence information stored in S603 when the timer expires (S604).

Next, operations when the paging is executed will be described. First, the HeNB-GW 100 receives a PAGING message from the MME 200 (S611). This message includes S-TMSI of the UE 400 which is the target of the paging.

Next, the HeNB-GW 100 determines whether there is information of ECGI associated with S-TMSI included in the received message (S612). The correspondence information stored in S603 is present before the timer started in S604 expires. Meanwhile, when the timer is cleared due to the expiration of the timer, the correspondence information is absent.

Next, when it is determined in S612 that the correspondence information is present, the operation for optimizing paging is executed (S620). Since the operation of S620 is similar to that of S520 in FIG. 12, the description thereof will be omitted. On the other hand, when it is determined in S612 that the correspondence information is absent, the normal paging operation is performed (S630). Since the operation of S630 is similar to that of S530 in FIG. 12, the description thereof will be omitted.

[Effects]

As described above, the HeNB-GW according to the fifth exemplary embodiment specifies the HeNB on which the UE camps based on INITIAL UE MESSAGE in the operation sequence when the RRC connection is established. Further, by the use of the timer, the operation of the paging optimization is executed based on the HeNB only when the information of the HeNB on which the UE camps is new. Accordingly, when information of the HeNB on which the UE camps is old, the operation for optimizing the paging is performed based on the information, whereby it is possible to avoid the failure of the paging. In summary, it is possible to avoid occurrence of the service delay which is due to the re-execution of the paging. Further, the fifth exemplary embodiment may be executed in combination with the second to fourth exemplary embodiments, thereby achieving the effects according to the second to fourth exemplary embodiments.

While the present invention has been described in detail based on the preferred exemplary embodiments, the present invention is not limited to the above embodiments and may be changed in various ways without departing from the spirit of the present invention.

For example, while S-TMSI is used as information for identifying the UE 400 in the fifth exemplary embodiment, International Mobile Subscriber Identity (IMSI) may be used instead. S-TMSI may be other types of information as long as it can identify the UE. In a similar way, ECGI may be other types of information as long as it can identify the HeNB.

Furthermore, in the mobile communication system defined by the 3GPP, the HeNB-GW is not necessarily present. In such a case, in the second exemplary embodiment, the HeNB 300 may transmit or receive messages using S1AP to or from the MME 200 and the MME 200 may perform the operation of the HeNB-GW 100. In summary, the higher-level device with which the HeNB 300 according to the present invention communicates may be either the HeNB-GW 100 or the MME 200. When the higher-level device is the MME, the present invention may be applied using an eNB instead of using the HeNB.

Further, while the present invention is applied to the mobile communication system of the LTE including the UE, the HeNB, the HeNB-GW, and the MME in the second exemplary embodiment, the present invention may be applied to a 3rd Generation (3G) mobile communication system including UE, a Home Node B (HNB), an HNB Gateway (HNB-GW), and a Mobile Switching Center (MSC)/serving GPRS support node (SGSN). Further alternatively, the present invention may be applied to a mobile communication system including a macro base station such as a Node B (NB) or an evolved Node B (eNB) in place of the femto base station such as the HNB or the HeNB.

This application is based upon and claims the benefit of priority from Japanese Patent Application No. 2012-210767, filed on Sep. 25, 2012, the disclosure of which is incorporated herein in its entirety by reference.

REFERENCE SIGNS LIST

10 GATEWAY DEVICE
11 STORAGE UNIT
12 PROCESSING UNIT
13 TRANSMISSION UNIT
100 HeNB-GW
200 MME
300, 310, 320, 330 HeNB
400 UE
101, 201, 301, 311, 321, 331, 401 TRANSMISSION/RECEPTION UNIT
102, 202, 302, 312, 322, 332, 402 PROCESSING UNIT
103, 203, 303, 313, 323, 333, 403 STORAGE UNIT

The invention claimed is:

1. A gateway device comprising:
a memory that stores information regarding an environment around each of a plurality of radio base stations;
a controller that executes processing for determining, among the plurality of radio base stations, only a radio base station on which a mobile station last camped and another radio base station whose surrounding environment is close to the environment around the radio base station on which the mobile station last camped, as a transmission destination of a message to page the mobile station, based on the stored information; and
a transmission unit that transmits the message.

2. The gateway device according to claim 1, comprising a reception unit that receives a message regarding paging from a core network device;
wherein the controller executes the processing when a value of predetermined information included in the received message satisfies a predetermined condition.

3. The gateway device according to claim 2, wherein the predetermined information comprises at least one of:
information indicating a class of a Quality of Service (QoS) of a call in the paging;
information indicating a service type of the call; and
information indicating a type of a calling party.

4. The gateway device according to claim 2, wherein:
the reception unit receives the message from the radio base station,
the received message comprises information in which an identifier of the mobile station is associated with an identifier of the radio base station, and
the controller identifies the radio base station on which the mobile station has camped based on the received message.

5. The gateway device according to claim 4, wherein the controller deletes the associated information after an elapse of a predetermined period of time.

6. The gateway device according to claim 1, wherein:
a mobile communication system is a mobile communication system of a Long Term Evolution (LTE) defined by a Third Generation Partnership Project (3GPP),
the mobile station is a User Equipment (UE),
the radio base station is a Home evolved Node B (HeNB), and
the gateway device is an HeNB Gateway (HeNB-GW).

7. The gateway device according to claim 1, wherein:
the information regarding the environment around the radio base station is information regarding a radio environment around the radio base station, and comprises at least one of:
information of a cell of an Enhanced Universal Terrestrial Radio Access Network (E-UTRAN);
information regarding a cell of a Universal Terrestrial Radio Access Network (UTRAN);
information regarding a cell of a Global System for Mobile Communications EDGE Radio Access Network (GERAN);
information regarding a base station of a Worldwide Interoperability for Microwave Access (WiMAX);
information regarding a wireless Internet hotspot;
information regarding a TV station;
information regarding a radio station; and
information regarding a GPS.

8. The gateway device according to claim 1, wherein:
the information regarding the environment around the radio base station comprises at least one of:
an IP address allocated to the radio base station;
an address regarding a position in which the radio base station is installed;
a postcode;
a telephone number; and
identification information of a gateway device most recently connected to the radio base station.

9. A mobile communication system comprising a plurality of radio base stations and a gateway device that communicates with the plurality of radio base stations, wherein:
each of the plurality of radio base stations transmits information regarding an environment around that radio base station to the gateway device, and
the gateway device comprises:
a reception unit that receives the information;
a controller that executes processing for determining a radio base station on which a mobile station last camped and another radio base station whose surrounding environment is close to the environment around the radio base station on which the mobile station last camped, as a transmission destination of a message to page the mobile station, based on the received information; and
a transmission unit that transmits the message.

10. A paging method comprising the steps of:
storing information regarding an environment around each of a plurality of radio base stations;
executing processing for determining, among the plurality of radio base stations, only a radio base station on which a mobile station last camped and another radio base station whose surrounding environment is close to the environment around the radio base station on which the mobile station last camped, as a transmission destination of a message to page the mobile station, based on the stored information; and
transmitting the message to the radio base station to which the message is transmitted.

* * * * *